Nov. 24, 1931.  E. J. MAUSS  1,833,787
FISHING ROD ATTACHMENT
Filed Nov. 6, 1930
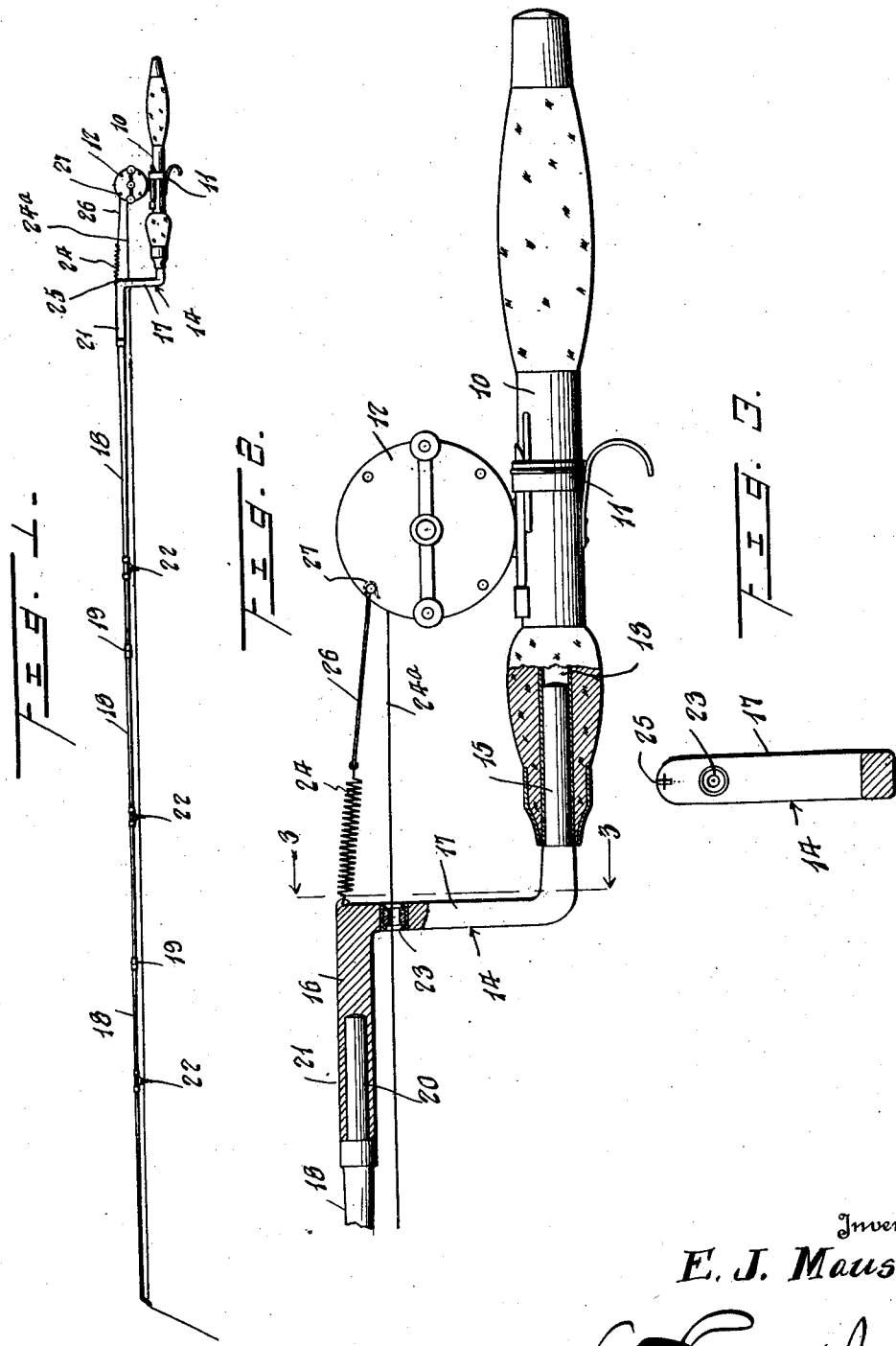

Patented Nov. 24, 1931

1,833,787

UNITED STATES PATENT OFFICE

EDWARD J. MAUSS, OF DU PAGE CROSSING, ILLINOIS

FISHING ROD ATTACHMENT

Application filed November 6, 1930. Serial No. 493,878.

This invention relates to an attachment for a fishing rod which functions as a line guide or guard and it primarily aims to provide a means which will render casting easier and the line which follows the pole to be arranged substantially straight.

Another object is to provide a construction wherein the guide members of the fishing pole may be arranged below rather than above the axis of the pole and wherein the line also passes through a transverse portion of the attachment in line with the guide.

Various additional objects and advantages will become apparent from a consideration of the description following taken in connection with accompanying drawings illustrating an operative embodiment.

In said drawings:—

Figure 1 is a view of a fishing pole equipped with my improvements.

Figure 2 is an enlarged elevation, partly in section to disclose details, showing the improvements, and Figure 3 is a sectional view taken on the line 3—3 of Figure 2.

Referring specifically to the drawings, 10 designates a usual or conventional handle of a fishing pole, the same having conventional means at 11 for detachably connecting a reel 12 thereto. The handle also has a socket at 13.

The attachment consists of a bracket or pole section 14 which has disalined, but parallel shanks at 15 and 16, connected by a transverse or cross member 17. Section 14 is preferably made in a single piece as shown and the shank 15 frictionally and detachably telescopes in the socket 13 as shown in Figure 2.

Conventional detachable rod sections are shown at 18, their joints being at 19, and the one nearest the shank 16 having its tenon or terminal 20 telescoped friction tight and detachably in a socket 21 of the shank 16. Usual line guides of ring or other form as at 22 are carried by the sections.

In accordance with my invention, a line guide is provided through the portion 17 as at 23, being of the usual agate ring construction. The line shown at 24ᵃ passes from the reel through the guide 23 and thence through the guides 22.

As a result, that portion of the line following the pole is straight and due to the fact that the rod sections 18 are capable of turning about the axis of the same, the guides 22 depend from the rod as shown in Figure 1. Of course if it is desired to use the pole with the guides 22 extending above the axis of the rod as in usual practice, the sections 18 may be adjusted to so dispose the guides.

The arrangement and construction described renders casting much easier and the attachment is such that it is applicable to any fishing rod or pole construction on the market.

A contractile spring 24 is fastened to a lug 25 at one end to the shank 16 and a link 26 extends from the other end of the spring and has a hook at 27 detachably engaging any suitable element on the reel 12, thereby holding the reel tight in its seat which is especially desirable when casting for large fish.

Various changes may be resorted to provided they fall within the spirit and scope of the invention.

I claim as my invention:—

1. A fishing pole attachment having disalined portions one attachable to a handle and the other to a pole section, and a line guide means between said portions.

2. A fishing pole attachment having disalined portions one attachable to a handle and the other to a pole section, and a line guide means between said portions, and a reel-anchoring means extending from the attachment.

3. An attachment of the class described comprising a hollow portion for attachment of a rod thereto, a shank portion offset from the first mentioned portion and extending in the opposite direction adapted for attachment to a handle, and line guide means between said portions.

4. An attachment of the class described comprising a hollow portion for attachment of a rod thereto, a shank portion offset from the first mentioned portion and extending in the opposite direction for attachment to a handle, a transverse member connecting said portions, and a line guide means in said member.

5. In a fishing pole, in combination with a handle and a pole section, an attachment having a transverse member, a shank extending therefrom and engaging the handle, a shank offset from the first shank and extending from the member and engaging the section, and a line guide carried by said member.

6. In a fishing pole, in combination with a handle and a pole section, an attachment having a transverse member, a shank extending therefrom and engaging the handle, a shank offset from the first shank and extending from the member and engaging the section, a line guide carried by said member, a reel on the handle, and an anchor means for said reel extending from the attachment.

In testimony whereof I affix my signature.

EDWARD J. MAUSS.